US012662588B2

(12) United States Patent (10) Patent No.: US 12,662,588 B2
Sagae (45) **Date of Patent: *Jun. 23, 2026**

(54) COMPOSITION INCLUDING CHLOROPRENE POLYMER, MOLDED BODY, AND METHOD FOR PRODUCING MOLDED BODY

(71) Applicant: SHOWA DENKO K.K., Tokyo (JP)

(72) Inventor: Ichiro Sagae, Tokyo (JP)

(73) Assignee: Resonac Corporation, Tokyo (JP)

( * ) Notice: Subject to any disclaimer, the term of this patent is extended or adjusted under 35 U.S.C. 154(b) by 747 days.

This patent is subject to a terminal disclaimer.

(21) Appl. No.: 17/790,397

(22) PCT Filed: Jan. 5, 2021

(86) PCT No.: PCT/JP2021/000053
§ 371 (c)(1),
(2) Date: Jun. 30, 2022

(87) PCT Pub. No.: WO2021/141012
PCT Pub. Date: Jul. 15, 2021

(65) Prior Publication Data
US 2023/0056113 A1      Feb. 23, 2023

(30) Foreign Application Priority Data
Jan. 6, 2020      (JP) ................................. 2020-000209

(51) Int. Cl.
*C08K 5/37*      (2006.01)
*C08K 3/22*      (2006.01)
(52) U.S. Cl.
CPC .................. *C08K 5/37* (2013.01); *C08K 3/22* (2013.01); *C08K 2003/2296* (2013.01)
(58) Field of Classification Search
CPC ...... C08F 14/02; C08F 220/06; C08F 220/44; C08F 236/06; C08F 236/08; C08K 2003/2296; C08K 3/04; C08K 3/20; C08K 3/22; C08K 5/09; C08K 5/18; C08K 5/34924; C08K 5/37; C08K 5/405; C08L 11/00
See application file for complete search history.

(56) References Cited

U.S. PATENT DOCUMENTS

| | | |
|---|---|---|
| 2,264,173 A | 11/1941 | Collins |
| 2,842,530 A | 7/1958 | Kovacic |
| 4,144,154 A | 3/1979 | Zapp et al. |
| 4,357,446 A | 11/1982 | Matoba |
| 5,523,355 A | 6/1996 | Oba et al. |
| 7,612,149 B2 | 11/2009 | Laakso, Jr. et al. |
| 2006/0205889 A1 | 9/2006 | Laakso, Jr. et al. |
| 2017/0292014 A1 | 10/2017 | Kitahara et al. |
| 2018/0371291 A1 | 12/2018 | Urata et al. |
| 2019/0062579 A1 | 2/2019 | Loccufier |
| 2023/0059522 A1 | 2/2023 | Sagae et al. |

FOREIGN PATENT DOCUMENTS

| | | |
|---|---|---|
| CN | 104144954 A | 11/2014 |
| CN | 104151747 A | 11/2014 |
| CN | 104804245 A * | 7/2015 |
| CN | 105017592 A | 11/2015 |
| CN | 106188707 A | 12/2016 |
| CN | 107429001 A | 12/2017 |
| CN | 108431110 A | 8/2018 |
| CN | 109863179 A | 6/2019 |
| EP | 3 156 461 A1 | 4/2017 |
| EP | 3 260 488 A1 | 12/2017 |
| EP | 3 533 809 A1 | 9/2019 |
| EP | 3 556 786 A1 | 10/2019 |
| EP | 3 556 786 B1 | 4/2021 |
| EP | 4 089 143 A1 | 11/2022 |
| JP | 59-1546 A | 1/1984 |
| JP | 2001-279023 A | 10/2001 |
| JP | 2002-138165 A | 5/2002 |
| JP | 2007-31700 A | 2/2007 |
| JP | 2008-533281 A | 8/2008 |
| JP | 2012-126831 A | 7/2012 |
| JP | 2013-159741 A | 8/2013 |
| JP | 2013-177504 A | 9/2013 |
| JP | 2016-166271 A | 9/2016 |
| JP | 2019-143002 A | 8/2019 |
| TW | 201534646 A | 9/2015 |
| WO | 2017/061441 A1 | 4/2017 |
| WO | 2018/078997 A1 | 5/2018 |
| WO | 2018/110369 A1 | 6/2018 |

OTHER PUBLICATIONS

Keith Berry, et al., "Mechanism for Cross-Linking Polychloroprene with Ethylene Thiourea and Zinc Oxide", Rubber Chemistry and Technology, vol. 88, No. 1, 2015, pp. 80-97.
International Search Report issued Mar. 16, 2021 in International Application No. PCT/JP2021/000053.
Written Opinion of the International Searching Authority issued Mar. 16, 2021 in International Application No. PCT/JP2021/000053.
Y. Nakamura, et al., "Evaluation of 2-R-4,6-Dithiol-s-Triazine for Neoprene Vulcanization", Rubber Chemistry and Technology, 1976, vol. 49, No. 4, 1031-1039 (9 pages).
Office Action dated Apr. 14, 2025, issued in U.S. Appl. No. 17/790,643.
Final Office Action dated Jul. 29, 2025, issued in U.S. Appl. No. 17/790,643.
Office Action dated Dec. 17, 2025, issued in U.S. Appl. No. 17/790,643.
Pye, "Choosing plastic colorants", ULTRUS, Sep. 12, 2019 (6 pages).

* cited by examiner

*Primary Examiner* — Ana L. Woodward
(74) *Attorney, Agent, or Firm* — Sughrue Mion, PLLC

(57) ABSTRACT

The present invention relates to a composition including a chloroprene polymer, a molded body, and a method for producing a molded body, and the composition includes a chloroprene polymer (A), and a thiol compound (B) having 2 mercapto groups in a molecule. An amount of the thiol compound (B) is 1.5 to 20 parts by mass per 100 parts by mass of the chloroprene polymer (A).

8 Claims, No Drawings

COMPOSITION INCLUDING CHLOROPRENE POLYMER, MOLDED BODY, AND METHOD FOR PRODUCING MOLDED BODY

CROSS REFERENCE TO RELATED APPLICATIONS

This application is a National Stage of International Application No. PCT/JP2021/000053, filed on Jan. 5, 2021, which claims priority from Japanese Patent Application No. 2020-000209, filed on Jan. 6, 2020.

TECHNICAL FIELD

The present invention relates to a composition including a chloroprene polymer, a molded body, and a method for producing a molded body.

BACKGROUND ART

Crosslinked chloroprene rubber has good general properties such as rubber physical properties, weather resistance, heat resistance, and chemical resistance, and thus has been used for various applications. Crosslinked chloroprene rubber has been widely used for, for example, civil engineering and construction applications such as expansion joint, bearing rubber, and anti-vibration rubber material for highways and bridges, automotive parts application, and industrial application. Products made of crosslinked chloroprene rubber has better weather resistance, heat resistance, and oil resistance than products made of natural rubber, which is another crosslinked rubber material, or styrene-butadiene rubber, and also has good durability, and therefore have been often used due to better total cost performance than the case where, for example, natural rubber is used.

As a related technology, xanthogen-modified chloroprene rubber has been proposed, which is capable of achieving good mechanical strength and stretch fatigue without aggravating distortion resistance and workability at a low temperature (e.g., Patent Literature 1).

CITATION LIST

Patent Literature

Patent Literature 1
International Publication No. WO2018/110369

SUMMARY OF INVENTION

Technical Problem

A crosslinking accelerator is used for producing crosslinked chloroprene rubber from a chloroprene polymer. For the crosslinking accelerator, for example, ethylenethiourea is often used, but it is desirable to perform the crosslinking treatment using a material having a small environmental load.

An object of the present invention is to provide a composition capable of performing the crosslinking treatment of a chloroprene polymer using a material having a relatively small environmental load.

Solution to Problem

The present inventors have conducted extensive studies to achieve the above object, and have found that the above object can be achieved by adding, in place of a crosslinking accelerator having a high environmental load, a thiol compound having 2 mercapto groups in a molecule to a chloroprene polymer, thereby completing the present invention. More specifically, the present invention relates to, for example, the following [1] to [10].

[1] A composition comprising a chloroprene polymer (A) and a thiol compound (B) having 2 mercapto groups in a molecule, wherein the amount of the thiol compound (B) is 1.5 parts by mass or more and 20.0 parts by mass or less per 100 parts by mass of the chloroprene polymer (A).

[2] The composition according to [1], wherein the chloroprene polymer (A) is at least one selected from a homopolymer of chloroprene and a copolymer of chloroprene and an additional monomer copolymerizable with the chloroprene.

[3] The composition according to [2], wherein the proportion of the additional monomer in the monomers used for forming the chloroprene polymer (A) is 30 mass % or less.

[4] The composition according to any of [1] to [3], wherein the thiol compound (B) has a primary mercapto group or a secondary mercapto group.

[5] The composition according to any of [1] to [4], wherein the thiol compound (B) has 2 partial structures represented by $CH_3(SH)CHCH_2COOCH_2-$ in a molecule.

[6] The composition according to any of [1] to [5], wherein the thiol compound (B) is 1,4-bis(3-mercaptobutyryloxy) butane.

[7] The composition according to any of [1] to [6], further comprising a metal oxide.

[8] The composition according to [7], wherein the metal oxide is zinc oxide.

[9] A method for producing a molded body comprising molding the composition according to any of [1] to [8], and heating.

[10] A molded body formed by using the composition according to any of [1] to [8].

Advantageous Effect of Invention

The present invention can provide a composition capable of performing the crosslinking treatment of a chloroprene polymer using a material having a relatively small environmental load.

DESCRIPTION OF EMBODIMENTS

Hereinafter, embodiments of the present invention will be described in detail, but the present invention is not limited to the following elements of embodiments. Components to be described below can be used singly or two or more thereof can be used.

[Composition]

An embodiment of the composition according to the present invention (hereinafter, also referred to as the "composition of the present embodiment") includes a chloroprene polymer (A), and a thiol compound (B) having 2 mercapto groups in a molecule (hereinafter, also simply referred to as the "thiol compound (B)"). The composition herein takes a form other than latex. Latex is a dispersion in which microparticles of, for example, a polymer are dispersed in a dispersion medium such as water. For example, latex of a chloroprene polymer is a dispersion in which microparticles of the chloroprene polymer (A) are dispersed in a dispersion medium.

<<Chloroprene Polymer (A)>>

The chloroprene polymer (A) can be a homopolymer of a 2-chloro-1,3-butadiene (chloroprene) monomer, or can also be a copolymer of an additional monomer copolymerizable with chloroprene and chloroprene (hereinafter, also referred to as the "chloroprene copolymer").

The chloroprene homopolymer does not have any structural unit derived from a monomer other than chloroprene. In contrast, the chloroprene copolymer has a structural unit derived from a chloroprene monomer and a structural unit derived from the comonomer. The comonomer herein refers to an additional monomer copolymerizable with chloroprene.

Examples of the comonomer include butadiene, butadiene derivatives other than chloroprene, styrene, acrylonitrile, acrylic acid, acrylic acid derivatives, methacrylic acid, and methacrylic acid derivatives. Examples of the butadiene derivative include alkylated 1,3-butadiene, and chlorinated 1,3-butadiene. Examples of the alkylated 1,3-butadiene include isoprene. Examples of the chlorinated 1,3-butadiene include 2,3-dichloro-1,3-butadiene, and 1-chloro-1,3-butadiene. Examples of the acrylic acid derivative include esters of acrylic acid. Examples of the methacrylic acid derivative include esters of methacrylic acid.

The proportion of the comonomer in the monomers used for forming the chloroprene polymer (A) is preferably 30 mass % or less, more preferably m mass % or less, and further preferably 0 mass %. When a proportion of the comonomer is 30 mass % or less of the monomers used for forming the chloroprene polymer (A), the crosslinking treatment can be well performed.

When the chloroprene polymer (A) is a homopolymer of chloroprene, the crosslinking rate is faster than when the chloroprene polymer (A) is a chloroprene copolymer. For this reason, it is preferable to use a chloroprene homopolymer to shorten the crosslinking time.

The chloroprene polymer (A) can also be any modified chloroprene rubber. The chloroprene polymer (A) can be, for example, sulfur-modified chloroprene rubber, mercaptan-modified chloroprene rubber, carboxyl-modified chloroprene rubber, xanthogen-modified chloroprene rubber, or a mixture of one or more of these.

<Method for Producing Chloroprene Polymer (A) and Compounds Used for Production>

Any polymerization method of monomers is applicable when producing the chloroprene polymer (A), and aqueous emulsion polymerization is preferable. Hereinafter, an example describes the case where latex of the chloroprene polymer (A) is produced by aqueous emulsion polymerization and then the chloroprene polymer (A) is isolated. The chloroprene polymer latex can include additives such as an emulsifier and a chain transfer agent within the range of not affecting the object of the present invention.

The polymerization temperature when producing the chloroprene polymer (A) is preferably 30° C. or more, more preferably 33° C. or more, and particularly preferably 35° C. or more. The polymerization temperature of the chloroprene polymer (A) is preferably 55° C. or less, more preferably 50° C. or less, and particularly preferably 45° C. or less. When a polymerization temperature is 30° C. or more, the productivity of the chloroprene polymer (A) is good, hence preferable. When a polymerization temperature is 55° C. or less, the vapor pressure of chloroprene reduces thereby making the polymerization operation extremely easy and resulting in good mechanical properties such as tensile strength of the polymer to be obtained.

When producing the chloroprene polymer (A), for example, an emulsifier, a polymerization initiator, a chain transfer agent, and a polymerization terminator can be used other than the monomers used for the polymerization.

An emulsifier can be added for the emulsion polymerization. For the emulsifier, an anionic surfactant is preferable. Examples of the anionic surfactant include a rosin acid soap, a fatty acid soap, a sodium salt of a naphthalene sulfonic acid condensate, a sodium salt of dodecylbenzene sulfonic acid, and a sodium salt of dodecyl sulfate. A combination use of a rosin acid soap and a fatty acid soap makes coagulation operation simple, and thus a rosin acid soap and a fatty acid soap may be used as emulsifiers. Examples of the rosin acid soap include a sodium salt of disproportionated rosin acid, and a potassium salt of disproportionated rosin acid. Examples of the fatty acid soap include oleic acid soap, and elaidic acid soap.

Hereinafter, examples of the amount of an anionic surfactant used per 100 parts by mass of the total amount of the monomers used for forming the chloroprene polymer (A) will be described.

The amount of the rosin acid soap used is, in terms of rosin acid, preferably 0.5 parts by mass or more, more preferably 0.7 parts by mass or more, and further preferably 0.9 parts by mass or more. Further, the amount of the rosin acid soap used is, in terms of rosin acid, preferably 8.0 parts by mass or less, more preferably 7.0 parts by mass or less, and further preferably 6.0 parts by mass or less.

The amount of the fatty acid soap used per 100 parts by mass of the total amount of the monomers is preferably 0.1 parts by mass or more, more preferably 0.2 parts by mass or more, and further preferably 0.3 parts by mass or more. The amount of the fatty acid soap used per 100 parts by mass of the total amount of the monomers is preferably 1.0 parts by mass or less, more preferably 0.8 parts by mass or less, and further preferably 0.7 parts by mass or less. When an amount of the fatty acid soap used per 100 parts by mass of the total amount of the monomers used for forming the chloroprene polymer (A) is 0.1 parts by mass or more, an effect to increase the fluidity is sufficient, hence preferable. When an amount of the fatty acid soap used per 100 parts by mass of the total amount of the monomers used for forming the chloroprene polymer (A) is 1.0 parts by mass or less, the soap does not deposit on the dough surface during kneading thereby causing to be slippery, or the soap does not excessively remain in a molding machine thereby causing fouling, whereby workability and operability are good in, for example, a roll, and a Banbury mixer, hence preferable.

The amount of the anionic surfactant, which is neither a rosin acid soap or a fatty acid soap, used is preferably 0.01 parts by mass or more, more preferably 0.02 parts by mass or more, and further preferably 0.05 parts by mass or more. The amount of the anionic surfactant, which is neither a rosin acid soap or a fatty acid soap, used is preferably 8.0 parts by mass or less, more preferably 7.0 parts by mass or less, and further preferably 6.0 parts by mass or less.

The particle size of the chloroprene polymer (A) can be adjusted depending on the amount of the anionic surfactant used. For example, the particle size of the chloroprene polymer (A) can be controlled by the amount of the rosin acid soap and the total amount of various emulsifiers to the monomers when polymerized. For example, the larger an amount of the emulsifier, the smaller the particle size of the chloroprene polymer (A) tends to be, and the smaller an amount of the emulsifier, the larger the particle size of the chloroprene polymer (A) tends to be.

The polymerization initiator is not particularly limited and can be selected from the general radical polymerization initiators. For example, when the chloroprene polymer (A) is produced by emulsion polymerization, a polymerization initiator such as a peroxide and an azo compound can be used. The peroxide can be either an organic peroxide or an inorganic peroxide. Examples of the usable peroxide include benzoyl peroxide, potassium persulfate, and ammonium persulfate. Examples of the usable azo compound include azobisisobutyronitrile. For the polymerization initiator, two or more radical polymerization initiators can be used in combination.

The amount of the polymerization initiator used per 100 parts by mass of the monomers used for the polymerization is preferably 0.01 parts by mass or more, more preferably 0.1 parts by mass or more, and further preferably 0.2 parts by mass or more. The amount of the polymerization initiator used per 100 parts by mass of the monomers used for the polymerization is preferably 10 parts by mass or less, more preferably 5 parts by mass or less, and further preferably 3 parts by mass or less. During the polymerization, one or more co-catalysts can be used in combination other than the polymerization initiator. Examples of the co-catalyst include anthraquinone sulfonate, potassium sulfite, and sodium sulfite.

The chain transfer agent is not particularly limited and can be selected from the general chain transfer agents. Examples of the chain transfer agent include alkyl mercaptan such as n-dodecyl mercaptan. The amount of the chain transfer agent used per 100 parts by mass of the monomers used for the polymerization is preferably 0.01 parts by mass or more, more preferably 0.05 parts by mass or more, and further preferably 0.1 parts by mass or more. The amount of the chain transfer agent used per 100 parts by mass of the monomers used for the polymerization is preferably 10 parts by mass or less, more preferably 5 parts by mass or less, and further preferably 3 parts by mass or less.

The polymerization terminator is not particularly limited and can be selected form the general polymerization terminators. The polymerization terminator is added to the system at which a predetermined polymerization conversion rate is achieved. Examples of the polymerization terminator include phenothiazine, para-t-butylcatechol, hydroquinone, hydroquinone monomethyl ether, and diethylhydroxylamine. The amount of the polymerization terminator added can be any amount at which the polymerization reaction can be terminated.

The particle size of the chloroprene polymer (A) is preferably 100 nm or more, and more preferably 250 nm or more. The particle size of the chloroprene polymer (A) is preferably 500 nm or less, and more preferably 450 nm or less. When a particle size of the chloroprene polymer (A) is 100 nm or more and 500 nm or less, stable particles can be formed, hence preferable. The particle size of the chloroprene polymer (A) can be obtained by, for example, measuring a sample obtained by diluting chloroprene polymer latex or a latex composition with pure water using a dynamic light scattering photometer.

Unreacted monomers in the chloroprene polymer latex are removed and then the chloroprene polymer (A) is isolated from the chloroprene polymer latex. For removing the unreacted monomers, for example, any known method such as steam stripping method can be used. After the unreacted monomers are removed, pH of the chloroprene polymer latex is adjusted to about pH=5 to 7 by adding acetic acid.

Subsequently, the polymer can be isolated by, for example, conventional cryocoagulation, water washing, or hot-air drying. For example, a −10 to −20° C. metal roll (a freeze roll) is immersed in the pH-adjusted chloroprene polymer latex and rolled, thereby to form a frozen film of the chloroprene polymer (A) on the roll surface. Then, the frozen film is detached from the roll surface and then washed with warm water to wash away additives included in the chloroprene polymer latex such as an emulsifier, and ice. Subsequently, the film is allowed to pass through a dryer to remove moisture.

<<Thiol Compound (B)>>

The thiol compound (B) included in the composition of the present embodiment has 2 mercapto groups in a molecule. The descriptions in the present Description are not intended to be bound by any specific theory, but it is presumed that the thiol compound (B), when heated to a temperature suitable for the crosslinking treatment (crosslinking temperature), reacts with the double bonds and a chloro group included in the chloroprene polymer (A) and forms a crosslinked structure in the chloroprene polymer (A). In other words, the thiol compound (B), when heated to the crosslinking temperature, acts as a film-forming aid for helping the film formation when forming a molded body from the chloroprene polymer (A).

The thiol compound (B) is not particularly limited as long as a compound has 2 mercapto groups in a molecule. The molecular weight of the thiol compound (B) is preferably 3000 or less, more preferably 2500 or less, and further preferably 2000 or less. Further, the molecular weight of the thiol compound (B) is preferably 100 or more, more preferably 150 or more, and further preferably 200 or more. The thiol compound (B) can be a reactant of an aliphatic alcohol and mercapto-substituted carboxylic acid, or can be a reactant of a mercapto-substituted alcohol and carboxylic acid. The carboxylic acid herein can be either aliphatic carboxylic acid or aromatic carboxylic acid.

Examples of the thiol compound having 2 primary mercapto groups in a molecule include butanediol bis(2-mercaptoacetate), hexanediol bis(2-mercaptoacetate), ethanediol bis(2-mercaptoacetate), 2,2'-(ethylenedithio) dimethanethiol, ethylene-glycol bis(3-mercapto-2-methylpropionate), propyleneglycol bis(3-mercapto-2-methylpropionate), diethyleneglycol bis(3-mercapto-2-methylpropionate), butanediol bis(3-mercapto-2-methylpropionate), octanediol bis(3-mercapto-2-methylpropionate), and bis(3-mercapto-2-methylpropyl) phthalate.

Examples of the thiol compound having 2 secondary mercapto groups in a molecule include 1,4-bis(3-mercapto-butyryloxy)butane, bis(1-mercaptoethyl)phthalate, bis(2-mercaptopropyl)phthalate, bis(3-mercaptobutyl)phthalate, ethyleneglycol bis(3-mercaptobutylate), propyleneglycol bis(3-mercaptobutylate), diethyleneglycol bis(3-mercaptobutylate), butanediol bis(3-mercaptobutylate), octanediol bis(3-mercaptobutylate), ethyleneglycol bis(2-mercaptopropionate), propyleneglycol bis(2-mercaptopropionate), diethyleneglycol bis(2-mercaptopropionate), butanediol bis(2-mercaptopropionate), octanedial bis(2-mercaptopropionate), ethyleneglycol bis(4-mercaptovalerate), propyleneglycol bis(4-mercaptoisovalerate), diethyleneglycol bis(4-mercaptovalerate), butanediol bis(4-mercaptovalerate), octanediol bis(4-mercaptovalerate), ethyleneglycol bis(3-mercaptovalerate), propyleneglycol bis(3-mercaptovalerate), diethyleneglycol bis(3-mercaptovalerate), butanediol bis(3-mercaptovalerate), and octanediol bis(3-mercaptovalerate).

Examples of the thiol compound having 2 tertiary mercapto groups in a molecule include ethyleneglycol bis(2-mercaptoisobutylate), propyleneglycol bis(2-mercaptoisobutylate), diethyleneglycol bis(2-mercaptoiscbutylate), butanediol bis(2-mercaptcisobutylate), and octanediol bis(2-mercaptoisobutylate).

The mercapto group included in the thiol compound (B) can be either a primary mercapto group, a secondary mercapto group, or a tertiary mercapto group but is preferably a primary mercapto group or a secondary mercapto group, and more preferably a secondary mercapto group. In the case of a primary mercapto group or a secondary mercapto group, steric hindrance is smaller than a tertiary mercapto group due to which the reactivity is considered better than a tertiary mercapto group. A plurality of mercapto groups in the thiol compound (B) can be mercapto groups having the same class or mercapto groups having different classes. For example, the thiol compound (B) can have a primary mercapto group and a secondary mercapto group.

Mercapto groups can be included as any partial structure in a molecule, and are preferably included as a partial structure represented by $CH_3(SH)CHCH_2COOCH_2$— in a molecule. Examples of preferable thiol having the partial structure represented by $CH_3(SH)CHCH_2COOCH_2$— include 1,4-bis(3-mercaptobutyryloxy) butane (a specific product example is Karenz MT® BD1 manufactured by Showa Denko K.K.).

When the thiol compound (B) mentioned above is used to prepare the composition of the present embodiment, a molded body having performance equal to or greater than the case where a thiourea compound is used can be produced without using a thiourea compound such as ethylenethiourea. The ethylenethiourea herein demonstrates reproductive toxicity and is thus included in the Substances of Very High Concern list under the REACH (Registration, Evaluation, Authorization and Restriction of Chemicals) Regulation. Other thiourea compounds also have a high environmental load just as is ethylenethiourea, and it is thus desirable to abstain from the use. For this reason, the composition of the present embodiment has a benefit of being capable of producing a molded body having performance equal to or greater than when a thiourea compound is used without using a thiourea compound having a high environmental load.

The amount of the thiol compound (B) in the composition per 100 parts by mass of the chloroprene polymer (A) is 1.5 parts by mass or more, preferably 1.8 parts by mass or more, and more preferably 1.9 parts by mass or more. When an amount of the thiol compound (B) in the composition is 1.5 parts by mass or more, the time required for the crosslinking treatment is short. Further, as the cross linking proceeds, the elasticity of the molded body increases and also the strength at breakage of the molded body increases. The amount of the thiol compound (B) in the composition per 100 parts by mass of the chloroprene polymer (A) is 20.0 parts by mass or less, preferably 15.0 parts by mass or less, and more preferably 11.0 parts by mass or less. When an amount of the thiol compound (B) in the composition is the above-mentioned upper limit value or less, the breaking strength and breaking elongation of the molded body do not reduce, hence preferable.

<<Other Components which can be Included in Composition>>

The composition of the present embodiment can further include, within the range of not affecting the object of the present invention, a metal oxide, an acid acceptor, a lubricant, an anti-aging agent, an antioxidant, a stabilizer, a filler, a softener, a processing aid, and a crosslinking accelerator (vulcanization accelerator).

The metal oxide can be used for accelerating the crosslinking of the chloroprene polymer (A) and can act as one or more of a crosslinking agent, a crosslinking accelerator, and a crosslinking aid. For the metal oxide, for example, magnesium oxide can be used. Examples of the metal oxide other than magnesium oxide include zinc oxide, lead oxide, trilead tetraoxide, and calcium oxide. Some materials used as the metal oxide function as an acid acceptor.

The amount of the metal oxide used in the composition of the present embodiment is preferably 0.5 parts by mass or more, more preferably 0.7 parts by mass or more, and further preferably 1.0 parts by mass or more per 100 parts by mass of the amount of the chloroprene polymer (A). Further, the amount of the metal oxide used in the composition is preferably 10.0 parts by mass or less, more preferably 9.5 parts by mass or less, and further preferably 9.0 parts by mass or less per 100 parts by mass of the amount of the chloroprene polymer (A). When an amount of the metal oxide used is 0.5 parts by mass or more, the crosslinking rate is sufficient, hence preferable. When an amount of the metal oxide used is 10.0 parts by mass or less, scorch less likely occurs, hence preferable.

The acid acceptor can be used for achieving a good crosslinking rate. Example of the acid acceptor include magnesium oxide, and a mildly alkaline inorganic substance, but magnesium oxide is the most preferable. Examples of the mildly alkaline inorganic substance include hydrotalcite. The amount of the acid acceptor used in the composition of the present embodiment is preferably 0.5 parts by mass or more, more preferably 1.0 parts by mass or more, and further preferably 1.5 parts by mass or more per 100 parts by mass of the chloroprene polymer (A). Further, the amount of the acid acceptor used in the composition is preferably 6.0 parts by mass or less, more preferably 5.5 parts by mass or less, and further preferably 5.0 parts by mass or less per 100 parts by mass of the chloroprene polymer (A). When an amount of the acid acceptor used in the composition is 0.5 parts by mass or more, the acid accepting (neutralizing) effect is sufficient, hence preferable. When an amount of the acid acceptor used in the composition is 6.0 parts by mass or less, the crosslinking rate is good thereby likely obtaining intended mechanical properties. Examples of the mechanical property include tensile property.

The lubricant is used for reducing frictional resistance against typical processing machines, preventing adherence of the composition to a processing machine, and also increasing the fluidity of the uncrosslinked composition. The lubricant is not particularly limited and can be selected from the general lubricants. Examples of the lubricant include fatty acid, fatty acid amide, fatty acid ester, high-melting-point wax, low-molecular weight polyethylene, and a combination of one or more of these. Examples of the fatty acid include stearic acid. Examples of the fatty acid amide include stearic acid amide. Examples of the fatty acid ester include n-butyl stearate.

The amount of the lubricant used in the composition of the present embodiment is preferably 0.2 parts by mass or more, more preferably 0.3 parts by mass or more, and further preferably 0.4 parts by mass or more per 100 parts by mass of the chloroprene polymer (A). The amount of the lubricant used in the composition is preferably 3.0 parts by mass or less, more preferably 2.7 parts by mass or less, and further preferably 2.5 parts by mass or less per 100 parts by mass of the chloroprene polymer (A). When an amount of the lubricant used is 0.2 parts by mass or more, the adherence to a molding machine such as a roll can be reduced sufficiently, hence preferable. When an amount of the lubricant used is 3.0 parts by mass or less, an intramolecular force between polymers is strengthened thereby consequently enhancing the strength after the crosslinking treatment and also enhancing the solvent resistance, hence preferable.

The anti-aging agent is roughly classified into an anti-aging agent added for the purpose of imparting heat resistance (heat-resistant anti-aging agent) and an anti-aging agent added for the purpose of preventing ozone aging (ozone anti-aging agent), which are preferably used in combination. For the heat-resistant anti-aging agent, a diphenylamine anti-aging agent is used. The diphenylamine anti-aging agent not only enhances the heat resistance of the chloroprene polymer (A) but also improves the mold fouling, hence preferable.

Examples of the diphenylamine anti-aging agent include octylated diphenylamine, p-(p-toluenesulfonylamide)diphenylamine, and 4,4'-bis(α,α-dimethylbenzyl)diphenylamine. Examples of preferable ozone anti-aging agent include N,N'-diphenyl-p-phenylenediamine (DPPD), and N-isopropyl-N'-phenyl-p-phenylenediamine (IPPD).

The amount of the anti-aging agents used in the composition of the present embodiment is preferably 1.0 parts by mass or more, more preferably 1.5 parts by mass or more, and further preferably 2.0 parts by mass or more per 100 parts by mass of the chloroprene polymer (A). The amount of the anti-aging agents used in the composition is preferably 5.0 parts by mass or less, more preferably 4.5 parts by mass or less, and further preferably 4.0 parts by mass or less per 100 parts by mass of the chloroprene polymer (A). When an amount of the anti-aging agent used is 1.0 parts by mass or more, the anti-aging effect can be sufficiently obtained, hence preferable. When an amount of the anti-aging agent used is 5.0 parts by mass or less, the crosslinking treatment is not blocked causing less fouling of a mold, hence preferable.

The chloroprene polymer (A) generally has better durability than natural rubber and styrene-butadiene rubber, but the polymer contains unsaturated bonds and is easily deteriorated by oxygen. For this reason, the composition of the present embodiment can include, for example, an antioxidant and a stabilizer within the range of not affecting the effect of the present invention.

Examples of the antioxidant include a hindered phenol antioxidant, and an amine antioxidant. Examples of the hindered phenol antioxidant include 2,2'-methylene-bis(4-ethyl-6-t-butylphenol), 4,4'-methylene-bis(2,6-di-t-butylphenol). Examples of the amine antioxidant include alkylated diphenylamine and a derivative thereof.

For the stabilizer, for example, an ultraviolet absorber can be used. Examples of the ultraviolet absorber include 2-(5-methyl-2-hydroxyphenyl)benzotriazole.

The amount of the antioxidant or the stabilizer used per 100 parts by mass of the polymer is preferably 0.1 parts by mass or more, more preferably 0.2 parts by mass or more, and further preferably 0.3 parts by mass or more. The amount of the antioxidant or the stabilizer used per 100 parts by mass of the polymer is preferably 10.0 parts by mass or less, more preferably 7.0 parts by mass or less, and further preferably 5.0 parts by mass or less. When an amount of the antioxidant is within the above range, a sufficient antioxidant effect can be obtained, and also the crosslinking treatment is not blocked and a color tone less likely de-grades.

Examples of the filler include carbon black and other fillers. Examples of the carbon black (ASTM (American Society for Testing and Materials) D1765) grade include PEE grade (Fast Extruding Furnace), SRF grade (Semi-Reinforcing Furnace), HAF grade (High Abrasion Furnace), and ISAF grade (Intermediate Super Abrasion Furnace). One or more of these carbon blacks can be used in the composition. SRF grade is often used due to the good balance of dynamic properties of a molded body after crosslinking. For further enhancing the abrasion resistance of a molded body, HAF grade is used.

The amount of the carbon black used in the composition per 100 parts by mass of the chloroprene polymer (A) is preferably 10 parts by mass or more, more preferably 15 parts by mass or more, and further preferably 20 parts by mass or more. The amount of the carbon black used in the composition per 100 parts by mass of the chloroprene polymer (A) is preferably 120 parts by mass or less, more preferably 110 parts by mass or less, and further preferably 90 parts by mass or less. When an amount of the carbon black used is 10 parts by mass or more, dynamic properties of a molded body is sufficiently improved, hence preferable. When an amount of the carbon black used is 120 parts by mass or less, a molded body with good tensile property and having compression set resistance, flex resistance, and abrasion resistance can be obtained, hence preferable.

Examples of the additional filler other than the carbon black include anhydrous silicic acid, clay, and, in particular, hard clay, and one or more of these can be used. The amount of additional fillers used per 100 parts by mass of the chloroprene polymer (A) is preferably 0.0 to 20.0 parts by mass. When an amount of additional fillers added is 20 parts by mass or less, workability of a molded body is good, hence preferable.

Examples of the softener include a naphthenic process oil, an aromatic process oil, a petroleum process oil, and an organic ester process oil. Examples of the organic ester process oil include bis(2-ethylhexyl) phthalate (DOP), bis (2-ethylhexyl) sebacate (DOS), and bis(2-ethylhexyl) azelate (DOZ). One or more of these process oils can be used in the composition.

The amount of the softener used per 100 parts by mass of the chloroprene polymer (A) is preferably 2.0 parts by mass or more, more preferably 3.0 parts by mass or more, and further preferably 4.0 parts by mass or more. The amount of the softener used per 100 parts by mass of the chloroprene polymer (A) is preferably 40.0 parts by mass or less, more preferably 35.0 parts by mass or less, and further preferably 30.0 parts by mass or less. When an amount of the softener used is 2.0 parts by mass or more, the softening effect (plasticization) of a molded body is sufficient, hence preferable. When an amount of the softener used is 40.0 parts by mass or less, the tensile property and abrasion resistance of a molded body are good, and also the surface bleeding less likely occurs thereby less affecting the appearance of the molded body.

The processing aid is not particularly limited and can be selected from the general processing aids. The processing aid means an additive for improving various moldability (for example, extrusion, injection, and calendaring) including so-called kneading workability. Examples of the processing aid include stearic acid, waxes, and cis-1,4-polybutadiene, and one or more of these can be used.

The amount of the processing aid used per 100 parts by mass of the chloroprene polymer (A) is preferably 0.2 parts by mass or more, more preferably 0.4 parts by mass or more, and further preferably 1.0 parts by mass or more. The amount of the processing aid used per 100 parts by mass of the chloroprene polymer (A) is preferably 5.0 parts by mass or less, more preferably 4.5 parts by mass or less, and further preferably 4.0 parts by mass or less. When an amount of the processing aid used is 0.2 parts by mass or more, sufficient kneading workability is enabled, and an improving effect of molding can be obtained, hence preferable. When an amount of the processing aid used is 5.0 parts by mass or less, the mechanical properties of a molded body such as tensile property is good, and also the surface bleeding less likely occurs thereby less affecting the appearance of the molded body.

The crosslinking accelerator (vulcanization accelerator) can be selected from the crosslinking accelerators generally used for crosslinking of chloroprene polymers. Examples of the crosslinking accelerator include a dithiocarbamate crosslinking accelerator, a thiazole crosslinking accelerator, a thiuram crosslinking accelerator, a guanidine crosslinking accelerator, and a xanthogenate crosslinking accelerator. Examples of the dithiocarbamate crosslinking accelerator include sodium dibutylthiodicarbamate, zinc dibutylthiodicarbamate, and zinc diethylthiodicarbamate. Examples of the thiazole crosslinking accelerator include di-2-benzothiazolyl disulfide. Examples of the thiuram crosslinking accelerator include tetraethylthiuram disulfide, and tetrabutylthiuram disulfide. Examples of the guanidine crosslinking accelerator include diphenyl guanidine, and di-ortho-tolylguanidine. The amount of the crosslinking accelerator used per 100 parts by mass of the chloroprene polymer (A) is preferably 5.0 parts by mass or less. From the viewpoint of the environmental load, the composition of the present embodiment preferably does not include the crosslinking accelerator.

The composition, as an example, can be a composition obtained by mixing in 1.5 to 20 parts by mass of the thiol compound (B), 0.5 to 6.0 parts by mass of the acid acceptor, 0.2 to 3.0 parts by mass of the lubricant, 1.0 to 5.0 parts by mass of the anti-aging agents, 10.0 to 120.0 parts by mass of the carbon black, 0 to 20.0 parts by mass of the filler other than the carbon black, 2.0 to 40.0 parts by mass of the softener, 0.2 to 5.0 parts by mass of the processing aid, 0.5 to 10.0 parts by mass of the metal oxide, and 0 to 5.0 parts by mass of the vulcanization accelerator, per 100 parts by mass of the chloroprene polymer (A).

<Rubber Properties of Composition Before Crosslinking Treatment>

The composition before the crosslinking treatment has the maximum torque value of preferably 4.5 or more, more preferably 4.7 or more, and further preferably 5.0 or more when measured using a CURELASTOMETER type 7 tester in accordance with JIS K6300-2:2001. When a maximum torque value of the composition before the crosslinking treatment is 4.5 or more, the breaking strength and breaking elongation of the molded body obtained by the crosslinking treatment are in good balance, hence preferable.

The 90% vulcanization time of the composition before the crosslinking treatment is also called the optimal vulcanization time, which is preferably 45 minutes or less, and more preferably 42 minutes or less. When a 90, vulcanization time of the composition before the crosslinking treatment is 45 minutes or less, the time required for the crosslinking treatment is short, hence preferable.

[Molded Body]

The crosslinking treatment is performed on the composition of the present embodiment to form a molded body. Molded bodies are widely used for, for example, automotive parts application, civil engineering and construction applications, and industrial application. The civil engineering and construction applications include expansion joint, bearing rubber, and anti-vibration rubber material. The expansion joint includes expansion joint for viaducts, expansion joint for highways, and expansion joint for bridges.

The molded body is produced by, for example, kneading and molding the composition of the present embodiment including the chloroprene polymer (A) and the thiol compound (B) and then performing the crosslinking treatment.

In the crosslinking treatment, the composition is heated to an intended crosslinking temperature over an intended crosslinking time. The crosslinking temperature is preferably 110° C. or more, more preferably 115° C. or more, and further preferably 120° C. or more. The crosslinking temperature is preferably 190° C. or less, more preferably 180° C. or less, and further preferably 170° C. or less. The crosslinking time is preferably 2 minutes or more, more preferably 10 minutes or more, and further preferably 30 minutes or more. The crosslinking time can be preferably 60 minutes or less.

<Rubber Properties of Molded Body Obtained by Crosslinking Treatment>

The modulus at 100% elongation (M100) of the molded body is preferably 1.6 MPa or more, more preferably 1.7 MPa or more, and further preferably 2.0 MPa or more. When a modulus at 100% elongation is 1.6 MPa or more, the molded body becomes an elastic body having an intended flexibility, hence preferable. When a modulus at 100% elongation is 4.0 MPa or less, the elasticity of the molded body is high, hence preferable.

The modulus at 300% elongation (M300) of the molded body is preferably 7.0 MPa or more, more preferably 8.0 MPa or more, and further preferably 8.5 MPa or more. When a modulus at 300% elongation is 7.0 MPa or more, the flexibility and elasticity capable of responding to notable deformation are compatible, hence preferable. When a modulus at 300% elongation is 12 MPa or less, the elasticity is high, hence preferable.

The durometer hardness of the molded body is preferably 50 or more, more preferably 52 or more, and further preferably 55 or more. When a durometer hardness is 50 or more, crosslinking can be evaluated as proceeded. The upper limit value of durometer hardness of the molded body can also be, for example, 80.

The breaking strength of the molded body is preferably 13 MPa or more, more preferably 13.5 MPa or more, and further preferably 14 MPa or more. When a breaking strength of the molded body is 13 MPa or more, a crosslinked product less likely breaks, hence preferable. The upper limit value of breaking strength of the molded body can also be, for example, 25 MPa.

The tensile elongation at break of the molded body is preferably 300% or more, more preferably 350% or more, and further preferably 400% or more. When a tensile elongation at break of the molded body is 300% or more, a crosslinked product does not break even when elongated and used, hence preferable. The upper limit value of tensile elongation at break of the molded body can also be, for example, 700%, and can also be more preferably 500%.

The modulus at 100% elongation, modulus at 300% elongation, durometer hardness, breaking strength, and tensile elongation at break, of the molded body were measured by the methods described in examples described later.

<Heat Resistance of Molded Body Obtained by Crosslinking Treatment>

The absolute value of the difference in durometer hardness between before heating rubber after the crosslinking treatment to 100° C. and after maintaining the rubber at 100° C. for 70 hours is preferably 25 points or less, more preferably 23 points or less, and further preferably 21 points or less. When an absolute value of the difference in durometer hardness between before and after heating is 25 points or less, the flexibility is maintained even under a high-temperature environment, hence preferable.

The change rate of breaking strength between before heating rubber after crosslinking treatment (molded body) to 100° C. and after maintaining the rubber at 100° C. for 70 hours is preferably 30% or less, more preferably 27% or less, and further preferably 25% or less. When a change rate of breaking strength between before and after heating is 30% or less, the flexibility of the molded body is maintained even when subjected to the heating treatment and the molded body less likely breaks, hence preferable.

The change rate of breaking strength can be determined in accordance with an equation (1).

$$\text{Change rate of breaking strength} = (X_{after} - X_{before})/X_{before} \times 100 \tag{1}$$

In the equation (1), $X_{before}$ is the breaking strength obtained from the rubber after crosslinked before heated to 100° C. $X_{after}$ is the breaking strength obtained from the rubber after crosslinked after maintained at 100° C. for 70 hours.

The absolute value of the change rate in tensile elongation at break shown in the following equation (2) between before heating the rubber after the crosslinking treatment (molded body) to 100° C. and after maintaining the rubber at 100° C. for 70 hours is preferably 60% or less, more preferably 57% or less, and further preferably 55% or less. When an absolute value of the change rate in tensile elongation at break is 60% or less, the molded body less likely breaks even when elongated and used, hence preferable.

The change rate of tensile elongation at break can be determined in accordance with the equation (2).

$$\text{Change rate of tensile elongation at break} = (Y_{after} - Y_{before})/Y_{before} \times 100 \tag{2}$$

In the equation (2), $Y_{before}$ is the tensile elongation at break obtained from the rubber after crosslinked before heated to 100° C. $Y_{after}$ is the tensile elongation at break obtained from the rubber after crosslinked after maintained at 100° C. for 70 hours.

EXAMPLES

Hereinafter, the present invention will be specifically described based on examples but is not limited to these examples. In the following descriptions in examples, the "part" refers to "part by mass" unless otherwise stated. Further, the numerical values included in the table showing examples of the amounts mixed also refer to part by mass.

Measurement methods and calculation methods of physical properties used in Examples and Comparative Examples are first described, followed by individual Example.

[Measurement Methods for Physical Properties of Chloroprene Polymer Latex and Molded Body]

<Polymerization Conversion Rate of Chloroprene Polymer (A)>

An emulsified product after the start of the polymerization of the chloroprene polymer (A) was collected and allowed to stand in an oven at 141° C. for 30 minutes to dryness thereby to obtain a dried solid matter. The dried solid matter obtained by the drying treatment includes the polymer and solid contents other than the polymer. Thus, the components that do not volatile at 141° C. from each of the components used for the emulsion polymerization were calculated based on the amount of polymerization materials charged thereby to define as the mass of solid contents other than the polymer. Further, the value obtained by subtracting the mass of solid contents other than the polymer from the mass of the dried solid matter obtained by drying the emulsified product after the polymerization was defined as the "amount of the polymer produced", and a polymerization conversion rate was calculated using an equation (3).

$$\text{Polymerization conversion rate [mass \%]} = [(\text{amount of the polymer produced}/\text{amount of all monomers charged})] \times 100 \tag{3}$$

The "amount of all monomers charged" in the equation (3) is the sum of the amount of chloroprene charged and the amount of the comonomer charged included in the amount of the emulsified product collected to obtain the dried solid matter.

<Rubber Properties Before Crosslinking Treatment>

A test by a die vulcanization tester in accordance with JIS K6300-2:2001 was performed using a CURELASTOM-ETER type 7 tester. For the rubber properties before crosslinking, the maximum torque value and the 90% vulcanizing time were measured. For determining the 90% crosslinking time, a crosslinking status was observed with a crosslinking temperature at 160° C. while heating for 60 minutes.

<Evaluation on Physical Properties of Molded Body Obtained by Crosslinking Treatment>

A crosslinked sheet was cut to be a No. 3 dumbbell in accordance with JIS-K6251-2017 thereby to obtain a test piece. The sheet test piece was subjected to a tensile test by the method in accordance with JIS-K6251-2017 to measure a modulus at 100% elongation, a modulus at 300% elongation (M100 and M300, respectively), a breaking strength, and a tensile elongation at break, at 23° C. The thickness of the test piece was 2.0 mm. The durometer hardness was measured immediately after pressing a push needle of the durometer against the test piece in accordance with Type A of JIS-K 6253-3:2012. The test piece used for the measurement of durometer hardness was prepared in accordance with the method for obtaining and preparing a test piece described in JIS-K-6250-2019.

Further, for investigating the heat resistance of the molded body obtained by the cross linking treatment, the durometer hardness, breaking strength, and tensile elongation at break were measured after maintaining the molded body after the crosslinking treatment at 10° C. for 70 hours.

Production Example of a Chloroprene Polymer (A)

A reactor having an internal volume of 5 litters was charged with 2.0 kg of 2-chloro-1,3-butadiene (manufactured by Tokyo Chemical industry Co., Ltd.), 1.04 kg of pure water, 40 g of rosin acid (manufactured by ARAKAWA CHEMICAL INDUSTRIES, LTD, R-300), 2 g of n-dodecyl mercaptan (Tokyo Chemical Industry Co., Ltd.), 100 g of 20 mass % potassium hydroxide aqueous solution (special grade product manufactured by Wako Pure Chemical Corporation), 12.8 g of a sodium salt of β-naphthalene sulphonate formalin condensate (manufactured by Kao Corporation), and 6.7 g of a 15 mass % aqueous solution of sodium dodecyl benzene sulfonate (manufactured by Kao Corporation, NEOPELEX® G-15). The amount of each material charged was, in terms of 100 parts of 2-chloro-1,3-butadiene, 52 parts of pure water, 2 parts of rosin acid, 0.1 parts of n-dodecyl mercaptan, 1 part of potassium hydroxide, 0.64 parts of a sodium salt of β-naphthalene sulphonate formalin condensate, and 0.05 parts of sodium dodecyl benzene sulfonate.

The starting materials charged in the reactor were emulsified, whereby the rosin acid was converted to a rosin soap. Subsequently, using 0.3 parts of potassium persulfate (first-class product manufactured by Wako Pure Chemical Corporation) as a polymerization initiator, the polymerization was performed under a nitrogen atmosphere at 40° C. for 5 hours. The polymerization was terminated at the confirmation of a polymerization conversion rate of 67 mass %. The polymerization conversion rate was calculated in accordance with the equation (1).

Unreacted monomers were removed by steam distillation thereby to obtain a chloroprene polymer latex. Further, acetic acid was added to the chloroprene polymer latex to adjust pH to 6.0 and then a chloroprene polymer (A-1) was obtained by the conventional cryocoagulation drying method.

Hereinafter, individual Example will be described. Main ingredients used in Examples or Comparative Examples other than the chloroprene polymer (A-1) are shown in Table 1.

TABLE 1

| Kyowamag (R) 150-1 | Magnesium oxide | Manufactured by Kyowa Chemical Industry Co., Ltd. |
|---|---|---|
| NOCRAC (R) AD | Octylated diphenylamine | Manufactured by OUCHI SHINKO CHEMICAL INDUSTRIAL CO., LTD. |
| ShoBlack (R) N762 | Carbon black | Manufactured by Cabot Japan K.K. |
| Diaria process oil NP-24 | Lubricant (petroleum process oil, mineral oil) | Manufactured by Idemitsu Kosan Co., Ltd. |
| SUNNOC (R) | Selected special wax | Manufactured by OUCHI SHINKO CHEMICAL INDUSTRIAL CO., LTD. |
| LUNAC (R) S-50V | Stearic acid | Manufactured by Kao Corporation |
| Karenz MT (R) BD1 | 1,4-Bis(3-mercaptobutyryloxy)butane | Manufactured by Showa Denko K.K. |
| Karenz MT (R) NR1 | 1,3,5-Tris(2-(3-sulfanylbutanoyloxy)ethyl)-1,3,5-triazinane-2,4,6-trione | Manufactured by Showa Denko K.K. |
| Karenz MT (R) PE1 | Pentaerythritol tetrakis(3-mercaptobutylate) | Manufactured by Showa Denko K.K. |
| Accelerator ACCEL 22-S | Ethylenethiourea | Manufactured by Kawaguchi Chemical Industry Co., Ltd. |
| NOCCELER (R) MA-S | 2-Mercaptobenzothiazole, salt of dicyclohexylamine | Manufactured by SANSHIN CHEMICAL INDUSTRY CO., LTD. |
| Crosslinking agent TA-S | 2,4,6-Trimercapto-s-triazine | Manufactured by Sankyo Kasei Kogyo Co., Ltd. |
| Zinc oxide (2 types specified in JIS K1410: 2006) | Zinc oxide | Manufactured by SAKAI CHEMICAL INDUSTRY CO., LTD. |

Production Example of a Kneaded Composition Including Chloroprene Polymer (A-1)

The ingredients for the A kneaded composition were mixed in the amounts shown in Table 2 and kneaded at 60 rpm for 3 minutes under water-cooling using a Banbury mixer.

TABLE 2

| (part by mass) | |
|---|---|
| | A Kneaded composition |
| Chloroprene polymer (A-1) | 100 |
| Magnesium oxide | 4 |
| Octylated diphenylamine | 2 |
| Carbon black | 60 |
| Lubricant (petroleum precess oil, mineral oil) | 12 |
| Selected special wax | 2 |
| Stearic acid | 0.5 |
| Total | 180.5 |

Example 1

Each material was mixed in the amounts shown in the column under Example 1 of Table 3, kneaded for 10 minutes under water-cooling using a 10-inch (25.4 cm) roll to prepare a B kneaded composition, which was taken out as a sheet having a thickness of 2 mm.

Examples 2 to 3, Comparative Examples 1 to 4

B Kneaded compositions were prepared by the same treatment as the treatment described in Example 1 except that the compositions of each material used for the preparation were as shown in Table 3. In Comparative Example 1, ethylenethiourea was used in place of the thiol compound (B). Further, in Comparative Examples 3 and 4, thiol including 3 or more mercapto groups in a molecule was used in place of the thiol compound (B).

[Evaluations]

<Rubber Properties Before the Crosslinking Treatment>

Table 3 shows the results of the test performed using a CURELASTOMETER type 7 tester on the B kneaded compositions obtained in Examples 1 to 3 and Comparative Examples 1 to 4, respectively. MH in Table 3 refers to the maximum torque value.

<Preparation of Test Piece for Evaluation on Rubber Properties after Crosslinking Treatment>

The composition was crosslinked in a press molding machine at a mold temperature of 160° C. for 40 minutes thereby to obtain a sheet having a thickness of 2 mm. The crosslinked sheet was cut to be a No. 3 dumbbell in accordance with JIS-K6251-2017 thereby to obtain a test piece.

<Rubber Properties after Crosslinking Treatment>

Table 3 shows the measurement results of rubber properties on the B kneaded compositions obtained in Examples 1 to 3 and Comparative Examples 1 to 4, respectively, after performing the crosslinking treatment. All the compositions were measured for a durometer hardness, and a modulus at 100% elongation, a modulus at 300% elongation (M100 and M300, respectively), a breaking strength, and a tensile elongation at break, at 23° C. using the sheet prepared in accordance with the above preparation method of a test piece. The obtained results are shown in Table 3.

Further, Table 3 also shows the results measured for a durometer hardness, a breaking strength, and a tensile elongation at break after maintaining the rubber after the crosslinking treatment at 100° C. for 70 hours.

TABLE 3

| | | Example 1 | Example 2 | Example 3 | Comparative Example 1 | Comparative Example 2 | Comparative Example 3 | Comparative Example 4 |
|---|---|---|---|---|---|---|---|---|
| A Kneaded composition (part by mass) | | 180.5 | 180.5 | 180.5 | 180.5 | 180.5 | 180.5 | 180.5 |
| Zinc oxide (part by mass) | | 5.0 | 5.0 | 5.0 | 5.0 | 5.0 | 5.0 | 5.0 |
| Ethylenethiourea (part by mass) | | — | — | — | 1.0 | — | — | — |
| 1,4-Bis(3-mercaptobutyryloxy)butane (part by mass) | | 2.0 | 2.94 | 5.0 | — | 1.0 | — | — |
| 1,3,5-Tris(2-(3-sulfanylbutanoyloxy)ethyl)-1,3,5-triazinane-2,4,6-trione (part by mass) | | — | — | — | — | — | 3.71 | — |
| Pentaerythritol tetrakis(3-mercaptobutylate) (part by mass) | | — | — | — | — | — | — | 2.69 |
| Total (part by mass) | | 187.5 | 188.44 | 190.5 | 186.5 | 186.5 | 189.21 | 188.19 |
| MH | | 7.2 | 7.2 | 5.9 | 11.0 | 5.1 | 4.1 | 4.3 |
| 90% Crosslinking time | | 27.2 | 27.1 | 41.0 | 13.9 | 48.1 | 49.5 | 48.9 |
| Normal properties JIS No. 3 dumbbell 23° C. 50 RH % | Durometer hardness [Duro-A] | 55 | 56 | 54 | 64 | 52 | 52 | 52 |
| | Modulus at 100% elongation [MPa] | 2.2 | 2.5 | 2.3 | 4.5 | 1.2 | 1.5 | 1.5 |
| | Modulus at 300% elongation [MPa] | 9.0 | 11.7 | 10.2 | — | 4.1 | 5.5 | 5.1 |
| | Breaking strength [MPa] | 14.4 | 16.5 | 16.0 | 19.7 | 7.4 | 10.6 | 9.7 |
| | Tensile elongation at break [%] | 440 | 400 | 475 | 255 | 590 | 510 | 530 |
| Heat resistance 100° C. × 70 h | Durometer hardness [Duro-A] | 75 | 72 | 75 | 72 | 67 | 77 | 76 |
| | Change (Point) | +20 | +16 | +21 | +8 | +15 | +25 | +24 |
| | Breaking strength [MPa] | 17.5 | 18.6 | 17.1 | 19.1 | 18.9 | 18.0 | 17.0 |
| | Change rate (%) | +22 | −13 | −7 | −3 | +155 | +70 | +75 |
| | Tensile elongation at break [%] | 275 | 250 | 215 | 220 | 325 | 205 | 175 |
| | Change rate (%) | −37 | −38 | −55 | −14 | −45 | −60 | −67 |

The compositions obtained in any of Examples 1 to 3 showed good values in all the measured values of the normal properties and the property difference values between before and after heating, which were measured to confirm the heat resistance. Thus, when the thiol compound (B) is used in place of a crosslinking accelerator having a comparatively high environmental load such as ethylenethiourea, a rubber material having physical properties equal to or greater than the case where a crosslinking accelerator having a comparatively high environmental load is used can be formed.

The invention claimed is:

1. A composition comprising a chloroprene polymer (A), a thiol compound (B) having 2 mercapto groups in a molecule, and magnesium oxide, wherein the amount of the thiol compound (B) is 1.5 parts by mass or more and 5.0 parts by mass or less per 100 parts by mass of the chloroprene polymer (A), wherein the thiol compound (B) has 2 partial structures represented by $CH_3(SH)CHCH_2COOCH_2$— in a molecule.

2. The composition according to claim 1, wherein the chloroprene polymer (A) is at least one selected from a homopolymer of chloroprene and a copolymer of chloroprene and an additional monomer copolymerizable with the chloroprene.

3. The composition according to claim 2, wherein the proportion of the additional monomer in the monomers used for forming the chloroprene polymer (A) is 30 mass % or less.

4. The composition according to claim 1, wherein the thiol compound (B) is 1,4-bis(3-mercaptobutyryloxy)butane.

5. The composition according to claim 1, further comprising a metal oxide other than magnesium oxide.

6. The composition according to claim 5, wherein the metal oxide is zinc oxide.

7. A method for producing a molded body comprising molding the composition according to claim 1, and heating.

8. A molded body formed by using the composition according to claim 1.

* * * * *